(12) United States Patent
Sowul et al.

(10) Patent No.: US 8,869,817 B2
(45) Date of Patent: Oct. 28, 2014

(54) TRANSMISSION SEALING AND DRAINAGE DEVICE

(71) Applicant: GM Global Technology Operations LLC, Detroit, MI (US)

(72) Inventors: Henryk Sowul, Oxford, MI (US); Kristopher Villegas, Warren, MI (US)

(73) Assignee: GM Global Technology Operations, LLC, Detroit, MI (US)

( * ) Notice: Subject to any disclaimer, the term of this patent is extended or adjusted under 35 U.S.C. 154(b) by 85 days.

(21) Appl. No.: 13/676,906

(22) Filed: Nov. 14, 2012

(65) Prior Publication Data

US 2013/0192693 A1 Aug. 1, 2013

Related U.S. Application Data

(60) Provisional application No. 61/592,994, filed on Jan. 31, 2012.

(51) Int. Cl.
| | |
|---|---|
| F16K 51/00 | (2006.01) |
| F16K 33/00 | (2006.01) |
| F16H 57/029 | (2012.01) |
| F16K 24/04 | (2006.01) |
| F16K 17/26 | (2006.01) |
| F16H 57/027 | (2012.01) |

(52) U.S. Cl.
CPC ............... *F16K 33/00* (2013.01); *F16H 57/027* (2013.01); *F16H 57/029* (2013.01); *F16K 24/046* (2013.01); *F16K 17/26* (2013.01)

USPC .......................... 137/202; 137/244; 137/409

(58) Field of Classification Search
USPC ........ 137/202, 391, 409, 454.5, 244, 351.391
See application file for complete search history.

(56) References Cited

U.S. PATENT DOCUMENTS

| | | | | |
|---|---|---|---|---|
| 725,640 | A * | 4/1903 | Wemmer | 137/202 |
| 1,384,486 | A * | 7/1921 | Van Vechton | 137/200 |
| 1,897,492 | A * | 2/1933 | Ledoux | 137/433 |
| 2,261,518 | A * | 11/1941 | Holmes | 137/170.2 |
| 3,869,391 | A * | 3/1975 | Kramer | 210/222 |
| 4,346,731 | A * | 8/1982 | Sigworth, Jr. | 137/433 |
| 4,990,247 | A * | 2/1991 | Vandenberk | 210/130 |
| 5,435,335 | A * | 7/1995 | Klop | 137/202 |
| 5,579,803 | A * | 12/1996 | Welker | 137/202 |
| 6,058,969 | A * | 5/2000 | Bollwahn et al. | 137/583 |
| 6,332,475 | B1 * | 12/2001 | Brougham | 137/414 |
| 6,447,565 | B1 * | 9/2002 | Raszkowski et al. | 55/385.4 |
| 2006/0162775 | A1 * | 7/2006 | Drayer | 137/202 |
| 2010/0236845 | A1 * | 9/2010 | Ishii et al. | 180/65.6 |

* cited by examiner

*Primary Examiner* — Stephen M Hepperle
*Assistant Examiner* — Umashankar Venkatesan

(57) ABSTRACT

A sealing and drainage device for a motor vehicle transmission is located in a wall approximately near the bottom of the transmission housing and includes a ball and a plate that encloses the ball in a bore through the housing wall. The plate has an opening on which the ball sits under normal operating conditions. During unexpected flooding conditions, water flows through the opening into the bore. The ball floats on the water such that as the water rises in the bore, the ball rises as well to the top of the bore to seal the bore from the interior of the housing, preventing water from flowing into the housing.

16 Claims, 4 Drawing Sheets

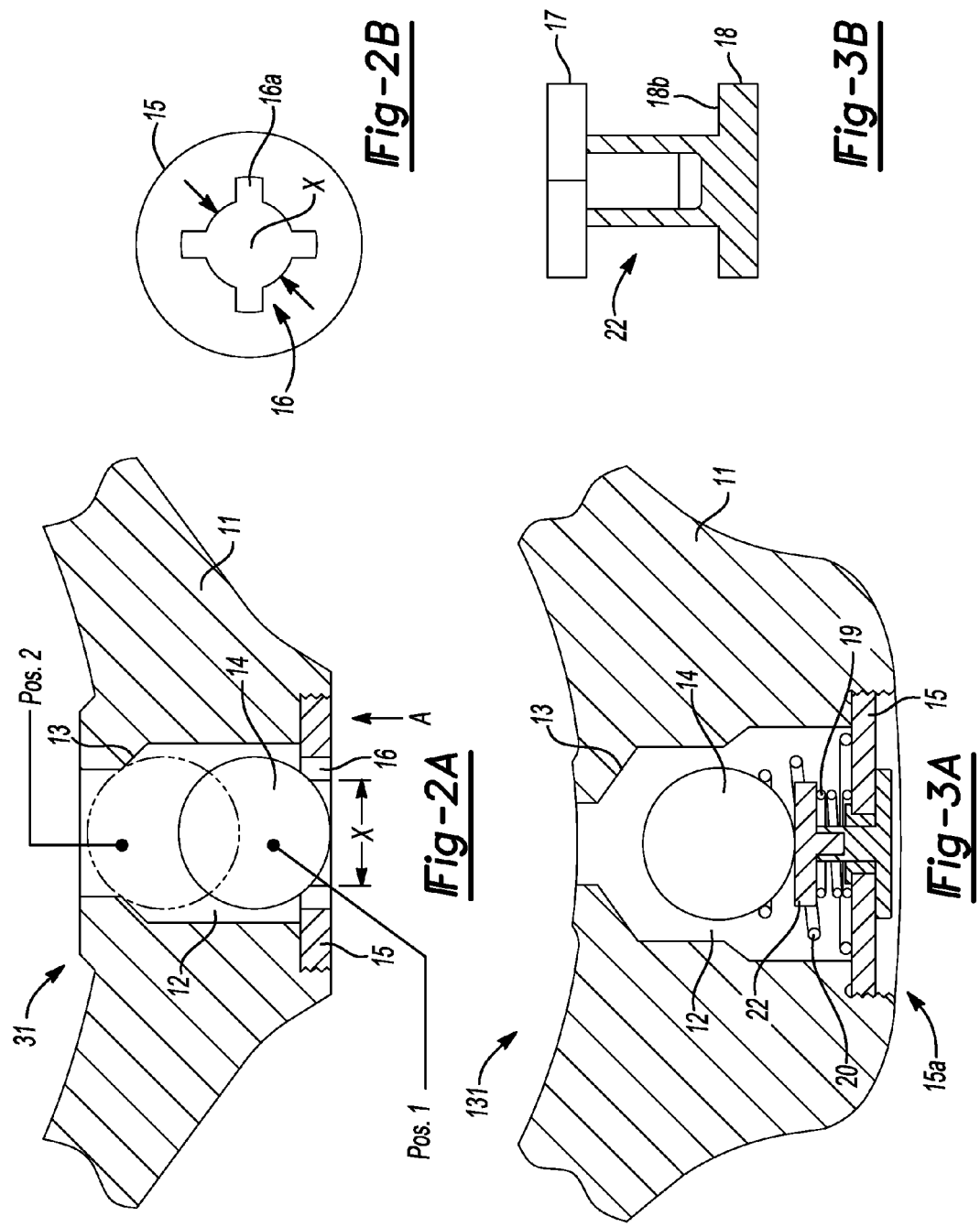

US 8,869,817 B2

TRANSMISSION SEALING AND DRAINAGE DEVICE

RELATED APPLICATION

This application claims the benefit of U.S. Provisional Application No. 61/592,994, filed Jan. 31, 2012, the entire contents of which are incorporated herein by reference.

FIELD

The present disclosure relates to a transmission for a motor vehicle. More specifically, the present disclosure relates to a sealing and drainage device for a transmission for a motor vehicle.

BACKGROUND

The statements in this section merely provide background information related to the present disclosure and may or may not constitute prior art.

Transmissions for motor vehicles include components such as gears and clutch assemblies enclosed in a housing. In unexpected circumstances, the housing may be partially or fully submerged in water when the vehicle crosses over deep water, which may occur, for example, during flooding. In such situations, the housing is partially or fully submerged for a short period of time. Hence, to fully seal the interior of the housing from incoming water for a long period of time is uneconomical.

Accordingly, there is a need for a sealing and drainage device for a transmission that prevents damage to the interior components of the transmission when the transmission housing is partially or fully submerged in water.

SUMMARY

The present invention provides a sealing and drainage device for a motor vehicle transmission. The sealing and drainage device is located in a wall approximately near the bottom of the transmission housing and includes a ball and a plate that encloses the ball in a bore through the housing wall. The plate has an opening on which the ball sits during normal operating conditions. During unexpected flooding conditions, water flows through the opening into the bore. The ball floats on the water such that as the water rises in the bore, the ball rises as well to the top of the bore to seal the bore from the interior of the housing, preventing water from flowing into the housing.

Further features, advantages, and areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way. The components in the figures are not necessarily to scale, emphasis instead being placed upon illustrating the principles of the invention. Moreover, in the figures, like reference numerals designate corresponding parts throughout the views. In the drawings:

FIG. 2A is a cross-sectional view of an arrangement for a sealing and drainage device in accordance with the principles of the present invention;

FIG. 2B is a view along the line A-A of FIG. 2A;

FIG. 3A is a cross-sectional view of an alternative sealing and drainage device in accordance with the principles of the present invention;

FIG. 3B is a close-up view of a plunger for the sealing and drainage device shown in FIG. 3A;

DETAILED DESCRIPTION

The following description is merely exemplary in nature and is not intended to limit the present disclosure, application, or uses.

Figure 1:
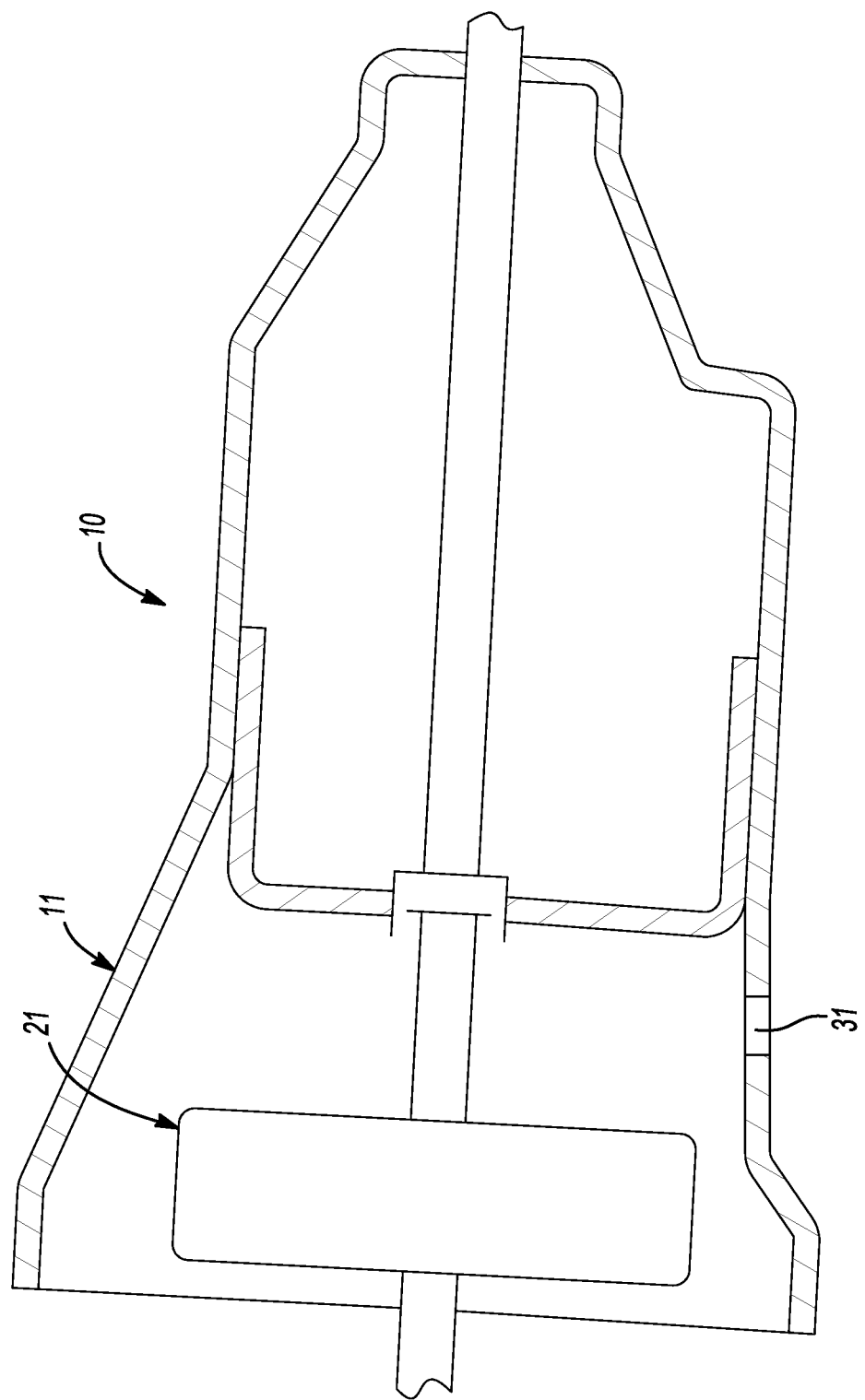
FIG. 1 is cross-sectional view of a motor vehicle transmission shown a location for a sealing and drainage device in accordance with the principles of the present invention.

Referring now to the drawings, a motor vehicle transmission embodying the principles of the present invention is illustrated in FIG. 1 and designated at 10. The transmission 10 includes a housing 11 enclosing a clutch assembly 21 and further includes a sealing and drainage device 31 at the bottom of the housing 11. When the housing 11 is partially or fully submerged in water, for example, in an unexpected flooding condition, the sealing and drainage device 31 seals the housing 11 to prevent the water from entering into the housing 11. Once the flooding condition is eliminated, the sealing and drainage device 31 allows water to drain out of the housing 11.

Referring to FIGS. 2A and 2B, the sealing and drainage device 31 includes a cylindrical bore 12 with a cone surface 13 machined into the housing 11. The sealing and drainage device 31 further includes a light ball 14 (made from, for example, a plastic material or rubber) which is located in the bore 12. The ball 14 is trapped in the bore 12 by a plate 15. The plate 15 can be permanently attached to the housing 11 by a staking or a press fit operation. Or the plate 15 may be attached to the housing 11 by threading the plate 15 into the housing 11 to provide access and serviceability of the ball 4. The plate 15 includes an opening 16 with a diameter X and also includes a set of slots 16A that extend outward from the opening 16.

When a flooding condition occurs, water enters the bore 12 through the opening 16 in the plate 15. The ball 14 floats and moves from a resting position (1) to a sealing position (2), where the ball 14 contacts the cone surface 13 in the bore 12, thereby preventing water from entering the housing 11. If flooding is happening for an extended period of time, some water may enter the area 21 of the clutch assembly (FIG. 1). When the flooding condition ends, and the water level drops below the sealing position (2), the ball 14 floats on the water and lowers its position to position (1) as the water drains out of the hole 16 until the ball 14 contacts the plate 15 around the circumference of the hole 16. Any water which already entered the clutch housing 11 flows out of the housing 11 and the bore 12 through the slots 16A around the opening 16.

Figure 4:
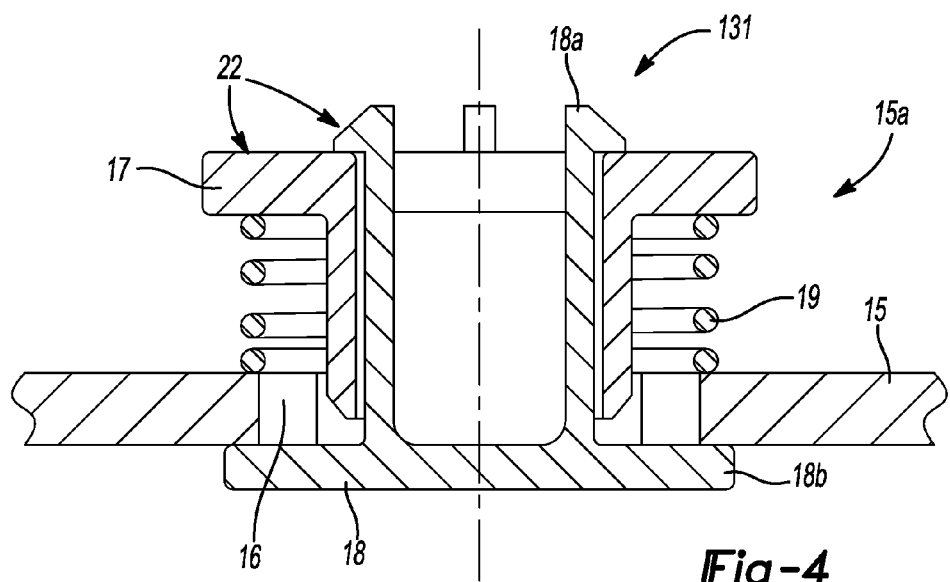
FIG. 4 is a close-up view of a plunger assembly for the sealing and drainage device of FIG. 3A.

In general, to maintain proper functionality, the cone surface 13 and the ball 14 are not contaminated with dust, mud, etc. Usually the bottom of the housing 11 is exposed to contaminants during normal operating conditions as well as during flooding conditions. Accordingly, in another arrangement of a sealing and drainage device 131 (FIGS. 3A and 3B), an anti-contamination feature is included. Specifically, the sealing and drainage device 131 includes a plunger assembly 22 with a spring 19. The plunger assembly 22 (FIG. 4) also includes an outer plug 17 and an inner plug 18. Again, the ball 14 is placed inside the bore 12. The bore 12 is closed with a plate assembly 15A (FIG. 4). In the implementation shown in FIG. 3A and FIG. 4, the plate assembly 15A incorporates the plate 15, the plunger assembly 22, and the spring 19.

Figure 5:
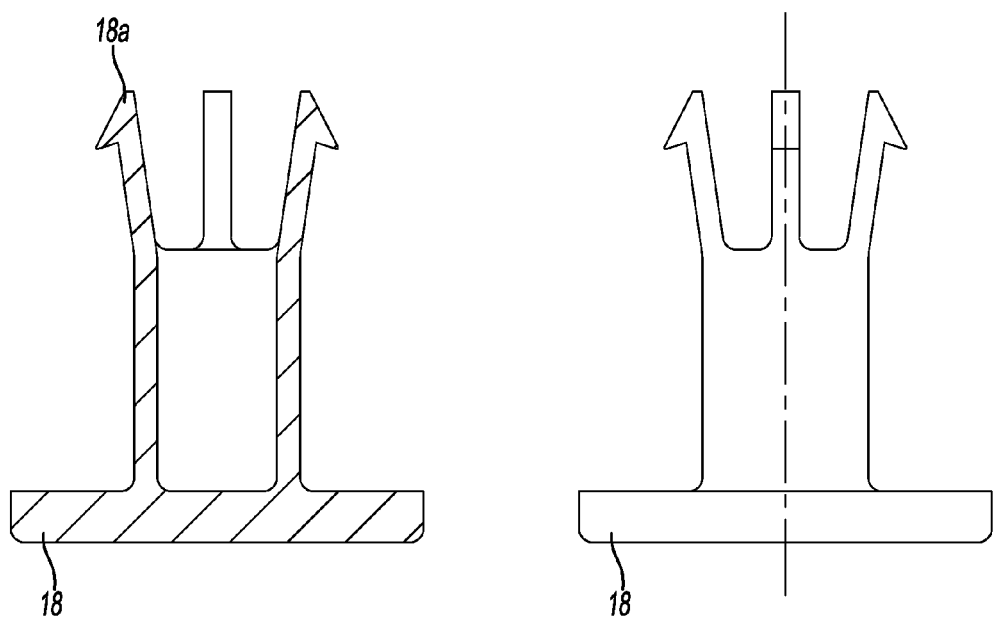
FIG. 5 is a close-up view of a plug for the plunger assembly shown in FIG. 4.
Figure 6:
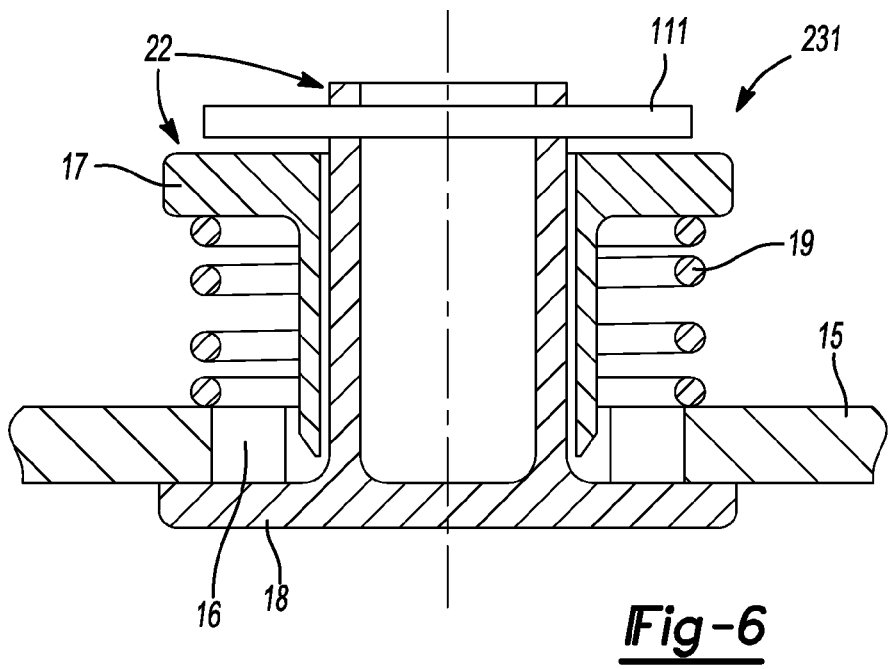
FIG. 6 is a cross-sectional view of yet another arrangement for a sealing and drainage device in accordance with the principles of the present invention.

The plate assembly 15A is assembled by inserting the inner plug 18 into the opening 16 of the plate 15 (see, for example, FIG. 2B and FIG. 4), then the spring 19 is dropped onto the plate 15, the outer plug 17 is slid onto the inner plug 18 until a set of locking features 18a (FIG. 5) engages with the outer plug 17. In an alternative arrangement, a sealing and drainage device 231 includes a locking feature such as a pin 111 to lock the outer plug 17 and the inner plug 18 together, as shown in FIG. 6.

The sealing and drainage device 131 shown in FIG. 3A contains the ball 14 trapped within the bore 12 and the plate assembly 15A. The ball 14 is held inside the bore 12 by a spring 20 above the plunger assembly 22. The plate assembly 15A may be attached to the housing 11 by staking or press fitting the plate assembly 15A into the housing 11. Alternatively, the plate assembly 15A may be threaded into the housing 11 to allow removal of the plate assembly 15A so that the ball 14 and the plunger assembly 22 can be serviced.

In the assembled condition, the spring 19 pushes the plunger assembly 22 up such that the outer flange surface 18b of the inner plunger 18 contacts the plate 15. As such, the opening 16 is closed off to protect the bore 12, the ball 14, and the plunger assembly 22 from contamination. Also note that the plunger assembly 22 in the up position slows the water flow into the bore 12 during flooding conditions.

When a flooding condition occurs, water enters the bore 12 through the opening 16 in the plate 15. The ball 14 floats and moves from the resting position to the sealing position, where the ball 14 contacts the cone surface 13 in the bore 12, thereby preventing water from entering into the housing 11. When the flooding condition ends and the water level drops below the sealing position, the ball 14 floats on the water and lowers its position as the water drains out of the hole 16. Note that when the flooding condition is diminishing and the surrounding water level drops, the water pressure head acting on inner plug 18 of the plunger assembly 22 collapses the spring 19 and moves the plunger assembly 22 down to further facilitate drainage of the water out of the housing 11. Any remaining water flows out of the housing 11 and the bore 12 through the slots 16A around the opening 16.

During the operation of the vehicle, it moves up and down, because of road interactions and vehicle acceleration/deceleration. This vehicle movement translates to movement of the sealing and drainage device 131 as well, since vertical vehicle motions create inertia forces on the sealing and drainage device 131. As such, the plunger assembly 22 inertia forces cause the spring 19 to deflect, which in turn allows the plugs 17 and 18 to move slightly up and down. This movement provides a self-cleaning mechanism for the plunger assembly 22 and the plate assembly 15A, which further improves cleanliness of the sealing and drainage device 131.

Figure 7:
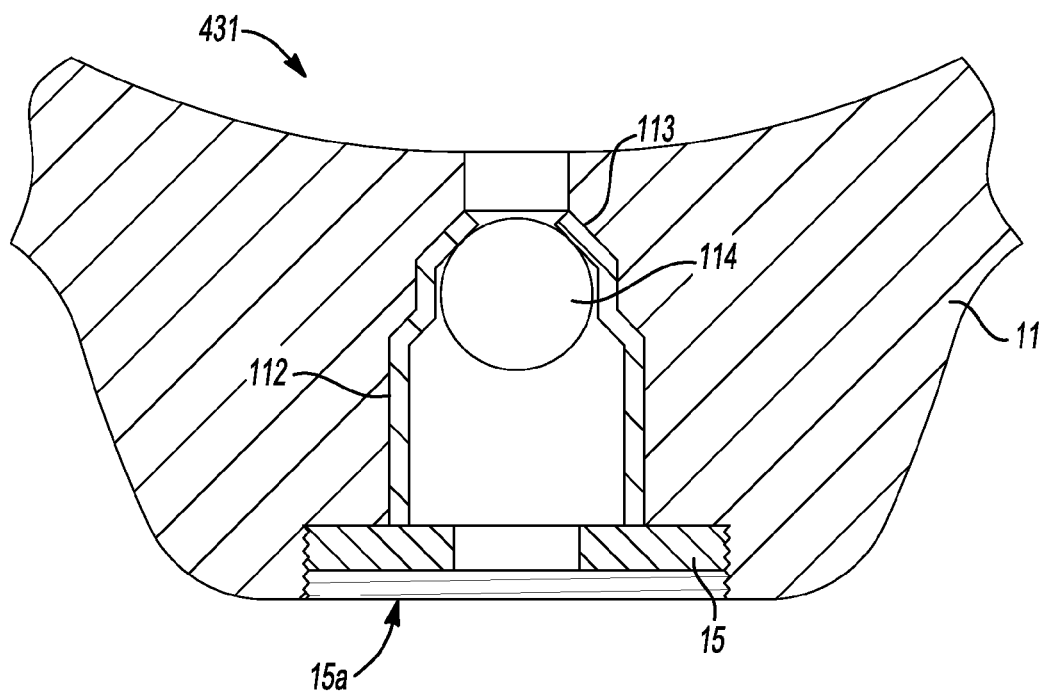
FIG. 7 is a cross-sectional view of yet another arrangement for a sealing and drainage device in accordance with the principles of the present invention.

In another implementation shown as a sealing and drainage device 431 in FIG. 7, the ball 14 and the plate assembly 15A arrives to the assembly line in a self-contained capsule C. The sealing and drainage device 431 may be assembled in a number of ways. For example, the ball housing 112 with the coned surface 113 may be designed as a separate part and press fit into the housing 11, and then the plate assembly 15A can be threaded into the housing 11. In another arrangement, the ball housing 112 is attached to the plate assembly 15A and then as a one assembly attached to the housing 11.

The description of the invention is merely exemplary in nature and variations that do not depart from the gist of the invention are intended to be within the scope of the invention. Such variations are not to be regarded as a departure from the spirit and scope of the invention.

What is claimed is:

1. A motor vehicle transmission comprising:
    a housing enclosing a clutch assembly;
    a sealing and drainage device located in a wall approximately near the bottom of the housing, the sealing and drainage device including a ball and a plate that encloses the ball in a bore through the housing wall, the plate having an opening on which the ball sits during normal operating conditions, the sealing and drainage device including an anti-contamination feature, the anti-contamination feature including a spring and a plunger assembly with an outer plug and an inner plug, the spring being located between the inner plug and the plate to urge the outer plug against the exterior of the plate so that the outer plug forms a seal with the exterior of the outer plate,
    wherein during unexpected flooding conditions, water flows through the opening into the bore, and
    wherein the ball floats on the water such that as the water rises in the bore, the ball rises as well to the top of the bore to seal the bore from the interior of the housing, preventing water from flowing into the housing.

2. The transmission of claim 1 wherein the bore has a cone shaped surface machined into the housing.

3. The transmission of claim 1 wherein the ball is made of plastic.

4. The transmission of claim 1 wherein the ball is made of rubber.

5. The transmission of claim 1 wherein the plate is press fitted into the housing.

6. The transmission of claim 1 wherein the plate is threaded into the housing.

7. The transmission of claim 1 wherein the plate includes an opening and a set of slots which extend outward from the opening.

8. The transmission of claim 1 wherein the inner plug and the outer plug are engaged together with a set of locking features.

9. The transmission of claim 1 wherein the inner plug and the outer plug are engaged together with a pin.

10. The transmission of claim 1 wherein the anti-contamination feature operates as a self-cleaning mechanism for the sealing and drainage device.

11. The transmission of claim 10 wherein inertia forces cause the spring to deflect to allow the inner plug and the outer plug to move up and down, and wherein the up and down movement of the inner plug and the outer plug provides the self-cleaning mechanism.

12. The transmission of claim 1 wherein the sealing and drainage device is a self-contained capsule.

13. The transmission of claim 12 wherein the self-contained capsule includes the ball and the plate as one assembly.

14. The transmission of claim 12 wherein the one assembly is attached to the housing.

15. A sealing and drainage device for motor vehicle transmission comprising:
    a ball;

a plate that encloses the ball in a bore through a transmission housing wall, the plate having an opening on which the ball sits during normal operating conditions;

an anti-contamination feature that includes a spring and a plunger assembly with an outer plug and an inner plug, the spring being located between the inner plug and the plate to urge the outer plug against the exterior of the plate so that the outer plug forms a seal with the exterior of the outer plate, wherein during unexpected flooding conditions, water flows through the opening into the bore, and wherein the ball floats on the water such that as the water rises in the bore, the ball rises as well to the top of the bore to seal the bore from the interior of the housing, preventing water from flowing into the housing.

16. The device of claim 15 wherein the anti-contamination feature operates as a self-cleaning mechanism for the sealing and drainage device.

\* \* \* \* \*